United States Patent [19]
Rogers

[11] Patent Number: 5,710,396
[45] Date of Patent: Jan. 20, 1998

[54] ENERGY-DISSIPATING VIBRATION DAMPING STRUCTURE

[76] Inventor: Lynn C. Rogers, 3945 N. Lake Shore Dr., Jamestown, Ohio 45335

[21] Appl. No.: 582,117

[22] Filed: Jan. 2, 1996

[51] Int. Cl.$^6$ ........................................ F16F 15/00
[52] U.S. Cl. ................................ 181/208; 181/290
[58] Field of Search ................................ 181/207, 208, 181/209, 290, 291, 294; 52/403.1, 144, 145; 244/1 N, 117 R, 119

[56] References Cited

U.S. PATENT DOCUMENTS

| | | | |
|---|---|---|---|
| 3,078,969 | 2/1963 | Campbell et al. | 52/403.1 |
| 3,262,521 | 7/1966 | Warnaka | 181/208 |
| 4,416,349 | 11/1983 | Jacobs | 181/208 |
| 4,425,980 | 1/1984 | Miles | 181/208 |
| 4,828,202 | 5/1989 | Jacobs et al. | 181/208 X |

*Primary Examiner*—Khanh Dang
*Attorney, Agent, or Firm*—William Weigl

[57] ABSTRACT

The invention is an improved apparatus for damping a wide range of oscillatory or wave motions in a plate, beam, shell or skin. The apparatus includes linearly-extending triangular hinged flexures in the form of spaced apart V-shaped spacer elements with the V substantially normal to the surface of the damped member, each flexure having two substantially rigid legs and a hinge flexure and a body portion adjacent the vertex of the V. An elongated substantially extensionally stiff constraining member is positioned in an offset, substantially parallel relationship to the surface of the damped member. A damping layer of a energy-dissipating viscoelastic material (VEM) connects the body portions of the hinged flexures to the constraining member. One or more of the spacer elements may have a lever attached to its body portion, the lever amplifying motion induced in its flexure toward the distal end of the lever. Multiple laterally-offset assemblies of spacer elements having motion amplifying levers, constraining members and VEM can be placed alongside one another in an offset parallel relationship with the levers being offset longitudinally and/or extending in opposite directions to dampen a wide range of short or long wave vibrations.

15 Claims, 4 Drawing Sheets

ENERGY-DISSIPATING VIBRATION DAMPING STRUCTURE

This invention relates to an energy-dissipating apparatus for damping vibrational oscillations which produce extensional strains in a beam, plate, shell or skin structure.

BACKGROUND OF THE INVENTION

Numerous apparatuses have been designed for attachment to structural members subjected to vibration for minimizing its effects, such as noise and metal fatigue. For example, U.S. Pat. No. 4,425,980 issued Jan. 17, 1984 to Miles illustrates how an aircraft skin dissipates vibration induced therein by fastening a second skin or structure thereto by means of a viscoelastic material, commonly called and referred to hereinafter as VEM. Examples of vibration dampers for use with beams and metal plates, hereinafter referred to as the damped member, are illustrated in U.S. Pat. Nos. 3,078,969 to Campbell, and 3,262,521 to Warnaka. Various applications of the latter have been proposed to deaden vibrations in bulkheads of both above and below-surface marine vessels and structural members such as beams and girders used in bridges and buildings.

In some previous damping art, the damped member has been metal and the damping apparatus typically includes at least two linearly-extending substantially rigid members generally in the form of thin plates. The plates typically each have at least one surface oriented substantially normal to the surface of the damped member and an entire edge either firmly affixed to the damped surface (e.g., by welding) or resiliently attached by a VEM layer to the damped surface. The generic term "standoff" may be used hereinafter to describe the orientation of the plate protruding outwardly from the surface, both in relation to the prior art and to my invention. In either case, the plates are positioned regularly or randomly in a row or series relationship to one another and are usually resiliently connected together by the VEM layer at the edges of the plates remote from the damped surface. The VEM typically completely encapsulates the plate edges.

When the wave motion of the structure whose vibration is to be damped causes oscillation about a plane through its neutral axis, the motion is directed outwardly by the plates due to their offset relationship from the neutral axis. The vibrations exhibit themselves as compound movements at the remote ends or edges of the plates, both parallel and perpendicular to the damped surface. As the damped member vibrates, the VEM layer between the adjoining plates' faces and edges is subjected to shearing and extensional forces, or a combination thereof. The energy-absorbing nature of the VEM dissipates some of the vibration and wave energy, resulting in the damping effect. The more the wave motion is amplified and the more the VEM layer is restricted from moving relative to the structure member, the greater the damping effect.

An elongated constraining element or member is typically attached to the VEM layer and bridges the remote ends of at least two plates. This arrangement increases the shear forces in the VEM layer and enhances the damping effect. The VEM layer generally isolates the constraining member from the damped surface such that there is no substantially rigid connection between the constraining member and the damped member.

There is a product produced by Swedish Acoustic Products Innovations of Goteburg, Sweden which has only a point of each standoff or plate welded to the damped member. When such damping apparatus is utilized, however, although the stiffness of the damped member can remain essentially uniform along the length of the damping apparatus, the point contact of each standoff can cause loss of perpendicularity of each standoff to the damped surface during oscillatory strains. This has the potential of producing less shear in the VEM layer and thus reduced damping effect, since the energy-dissipating arrangement is stiff in both flexure and shear.

SUMMARY OF THE INVENTION

In a preferred form of the invention, a plurality of upstanding standoffs in the form of V-shaped spacer elements with substantially extensionally stiff or rigid legs are spaced a regular or random distance apart and are generally linearly-aligned in a row or series with each spacer element having the divergent ends of the legs affixed to the damped surface by a hinge flexure. At least one of the legs of the V adjacent the vertex of the V includes a body portion of the spacer element to provide an attaching area or surface. The vertex comprises a first hinge flexure which allows rotation or pivoting of the legs relative to one another. The attachment points of the divergent ends of the V to the damped surface comprise second and third hinge flexures to allow rotation or pivoting of the legs relative to the damped surface. The length of the legs of the V amplify vibratory motion parallel as well as perpendicular to the damped surface while adding very little flexural stiffness to the damped member due to the substantially point contact of the hinge flexures of the legs with the damped surface. The first hinge flexure at the vertex of the V remains essentially perpendicular to the damped surface to a line drawn through the vertex between the second and third hinge flexures. In essence, an imaginary line drawn perpendicular to the surface through the first hinge flexure remains essentially perpendicular throughout and after flexible motion, except in an arrangement where the legs are of unequal lengths. In the latter case, some motion parallel to the surface of the damped member may occur, but the spacer element remains stiff in shear. A constraining member bridging or spanning at least two spacer elements or standoffs is disposed generally parallel to the damped surface at the remote ends of the spacer elements adjacent their respective body portions and is attached by the VEM layer to the body portions. The constraining member can be somewhat flexible but must be extensionally stiff to resist elongation parallel to the row orientation of the spacer elements. The spacer elements maximize the damping energy transmitted to the VEM layer by enabling enlargement of the movement of the damped surface and minimizing the resistance to bending.

It is the principal objective of the invention to provide an improved energy-dissipating apparatus for damping vibrational oscillations in a damped member susceptible to receiving induced vibration.

A more specific object is to provide a unique spacer element for use in such an apparatus wherein the spacer element structure transmits greater shear force to a VEM layer both parallel and perpendicular to the damped surface than heretofore.

A further object is to provide an improved spacer element in which the geometry of the spacer element can be made to correspond to the particular frequency range of the structure to be damped.

A further object is to provide a cantilevered arm affixed to one leg of a first spacer element or standoff and serving as both a motion-amplifying lever and a constraining member.

with the distal end of the cantilevered arm being connected by a VEM layer to at least one other standoff.

A further object is to provide for multiple rows of cantilevered arm damping structures to be closely positioned adjacent one another and the cantilevered arms connected together by a VEM layer so as to effectively dampen vibrations of differing wave lengths and frequencies.

A further object is to provide an apparatus for damping vibrational oscillations where such damping structure or structure to be damped is partly or wholly made from structural materials other than metal.

Another object is to provide a standoff in the form of a triangular hinged flexure, in which the member in which vibrations are induced constitutes one side of the triangle.

A further object is to provide for fixed attachment of a cantilevered arm to a leg of the triangle in a manner which amplifies motion at the end of the arm.

Another object is provide for legs of such triangle to be of unequal lengths and for attaching such cantilevered arm in a position on the shorter one of said legs to obtain maximum amplification of motion.

Other objects will become apparent from the following description, in which reference is made to the accompanying drawings.

DESCRIPTION OF THE PREFERRED EMBODIMENTS

In order to appreciate the phenomenon that is taking place within a spacer element about to be described, one should imagine a triangle with three stiff legs surrounding a centrally-open area, and also assume that there is a pivotal hinge flexure at each of the three vertices of the triangle. Neither leg is capable of rotating or pivoting with respect to an adjacent leg about a hinge flexure at one of its ends because it is inhibited from doing so by being locked against rotation by the other two legs. However, if one of the legs is capable of repetitive longitudinal stretching and contraction from extensional strains induced in that one leg from vibrational or wave motion thereof, the hinge flexure at the vertex of the other two legs will move toward and away from the one leg during the one leg's alternate shortening and lengthening. When such extensional strains are induced in the one leg, those strains cause generally perpendicular motion in the hinge flexure between the other two legs through lengthwise movement of the other two legs and pivoting due to flexibility at the hinge flexure connecting them. The latter hinge flexure can be said to be soft in flexure and stiff in shear with respect to the one vibrating leg, which, according to this invention, is a structure member whose oscillatory motion is to be damped by dissipation of energy. With this in mind, let us now proceed to a detailed description of certain embodiments of the invention.

Figure 1:
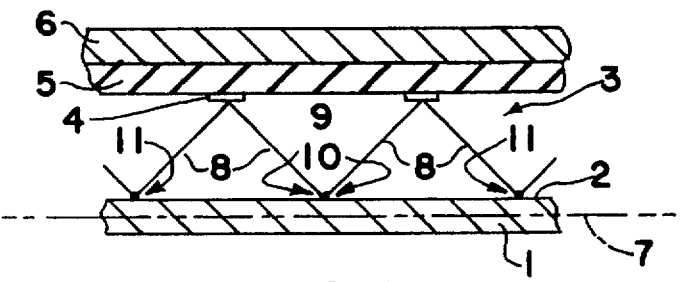
FIG. 1 is a schematic cross-sectional side view of one embodiment of the invention showing a row of V-shaped spacer elements with divergent ends of the legs affixed to the surface of a damped member. Body portions adjacent the vertices of the V's are attached by a VEM layer to a constraining member spanning multiple spacer elements.

In accordance with this invention and as best can be seen in FIG. 1, the damping of a structure member 1 subject to flexural vibrations and wave motion having an extended surface 2 to be damped is provided by a combination of V-shaped spacer elements 3, a substantially rigid non-extendible constraining member 6, and a VEM layer 5. Each spacer element 3 has two extensionally stiff or rigid legs 8 and a body portion 4 adjacent the vertex of the V. One end of each leg 8 is firmly but flexibly affixed to the other leg 8 at the vertex of the V as at a first hinge flexure 9. The first hinge flexure 9 allows the divergent ends of the legs 8 to rotate or pivot. The spacer elements 3 are arranged in a linearly-extending row or line and are regularly or randomly located with the V of each preferably being oriented substantially normal to the damped surface 2. The constraining member 6 is positioned in an offset relation and is preferably substantially parallel to the damped surface 2.

Figure 3:
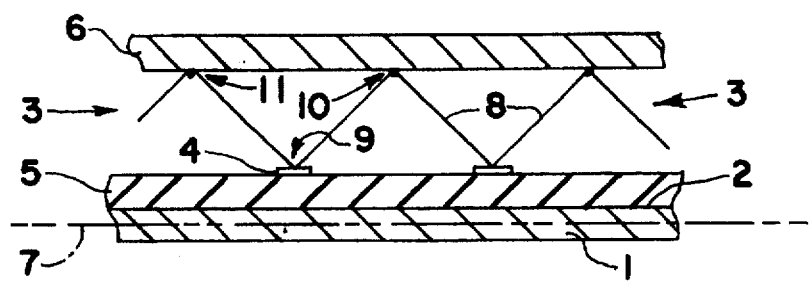
FIG. 3 is a schematic cross-sectional side view of an alternate embodiment of the invention showing the divergent ends of the legs of the spacer elements firmly affixed to the constraining member.

The spacer elements 3 can be oriented with the divergent ends of each leg 8 attached to either the damped surface 2 as in FIG. 1 (where the V of each spacer element is inverted) or to the constraining member 6 as shown in FIG. 3 (where each V is right-side up), the attachment points comprising a second hinge flexure 10 and a third hinge flexure 11 which allow pivoting of each leg 8 relative to the member 1 or 6 with minimal resistance. The VEM layer 5 resiliently attaches the body portions 4 to the other member of said members 1 or 6 and serves as an energy absorber for dissipating energy. The VEM is selected to have a stiffness or modulus of elasticity that is substantially less than that of the damped member 1 or 6, the spacer elements 3, and the constraining member 6 and is characterized by high energy-dissipation capability. Various well-known materials of this type may be used, such as asphalt, waxes, soft rubber, rubber-like polymers and many other elastic or plastic materials having the desired energy-absorbing properties. Where the term energy-dissipating mechanism, viscoelastic material or VEM is used, it is intended to include all such energy-dissipating materials or devices mechanical or electronic, including dashpots or frictionally-contacting members which function to dissipate energy. The energy-dissipating mechanisms illustrated herein are all passive, however, such mechanism may be active and fall within the scope of the appended claims.

Figure 2:
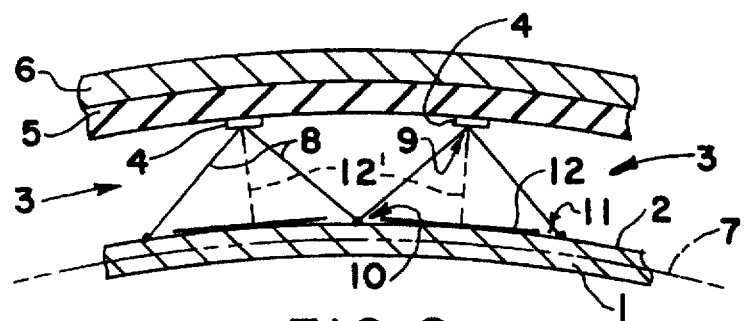
FIG. 2 is a schematic cross-sectional side view of the embodiment of FIG. 1 illustrating, in an exaggerated fashion, how the vertices of the V's remain essentially perpendicular to the surface of the damped structure while the surface stretches during oscillatory vibration of the structure member.

When the damped member 1 is subjected to flexural vibrations, bending occurs about a neutral axis 7 through the damped member 1. This flexing, exaggerated for better understanding, is shown in one direction only in FIG. 2, it being understood that member 1 will also flex in the opposite direction from the static condition of the neutral axis 7. The net effect of the flexural vibrations is to cause repetitive extensional strains in the surfaces of member 1, alternately stretching and contracting the surface of member 1 along its length. As the damped member 1 bends at the neutral axis 7 in the direction shown in FIG. 2, the second and third hinge flexures 10 and 11 move slightly further apart as the surface 2 elongates. While this is occurring, the first hinge flexure 9 and body portion 4 remain both parallel and perpendicular to the damped surface 2 although moving very slightly closer to surface 2. The first hinge flexure 9 stays directly perpendicular to a line 12 drawn tangent to surface 2 as shown by dotted line 12'. The dotted line 12' is midway between the second and third hinge flexures 10 and 11 in those instances where legs 8 are of equal length. It is this movement of the first hinge flexure 9 as translated through the body portion 4 to the VEM layer 5 which causes the shear energy to be resisted and dissipated in the VEM layer 5.

The spacer elements 3 can be made in any of a great variety of ways and configurations. For example, the elements can be constructed from any standard beam member having at least one flange, such as an I-beam, Z-beam, or T-beam member. In the case of an I-beam, at least one longitudinally spaced slot laterally extending completely through the upper flange and the web, but not through the lower flange, forms discrete spacer elements joined together by the lower flange. The lower flange must be relatively thin and flexible compared to the damped member and be positioned close to damped surface 2 in order to keep the neutral axis of the combination as close as possible to the original neutral axis 7 of the damped member 1. This results in minimizing the energy stored in the lower flange during flexure of the damped member 1 and transmits the maximum energy to the VEM layer 5. When constructed in any cross-sectional configuration in beam fashion, each spacer element may have three cutouts through the web to form the three hinge flexures and the V-shape with two legs for proper transfer of energy to the VEM layer.

Figure 4:
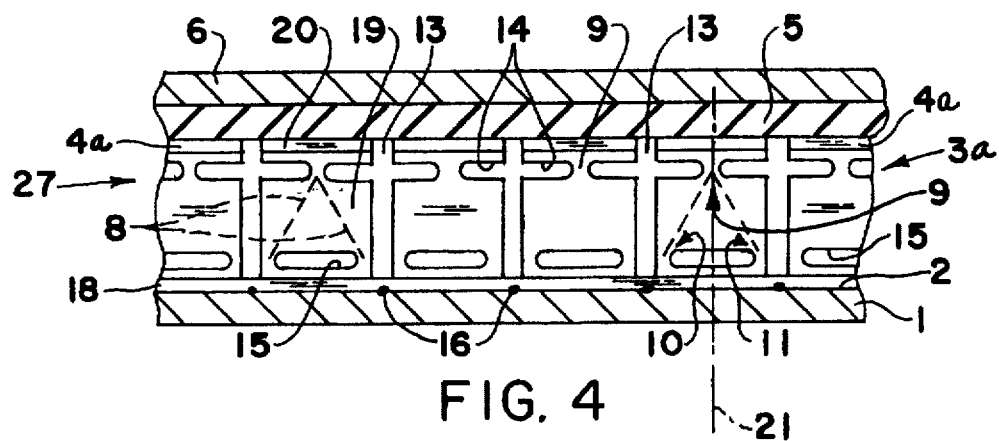
FIG. 4 is a side view of one embodiment of the invention functionally identical to that of FIG. 1.

FIG. 4 shows an I-beam 27 having slots 13 extending through an interrupted upper flange 20 and a web 19 so as to configure the I-beam 27 into discrete interconnected spacer elements 3a. Such construction can be produced by machining, chemically milling, stamping or other known technique. The upper flange 20 of the spacer elements 3a became body portions 4a which are resiliently attached by the VEM layer 5 to the constraining member 6. A lower flange 18 is attached to the damped surface 2 as by small welds 16 or other fastening, such as by bonding or mechanical means. Each spacer element 3a has two upper slots 14 disposed on opposite sides of a longitudinal dot-dash line 21 of each spacer element 3a directly below body portion 4a, the minimal material between the upper slots 14 comprising the first hinge flexure 9. A third slot 15 is disposed about and, in this embodiment, perpendicular to the longitudinal line 21 of each spacer element 3a adjacent the lower flange 18. Slot 15 extends to points adjacent the sides of each spacer element 3a to form the second and third hinge flexures 10 and 11. Together, flexures 9, 10 and 11 define a triangular hinged flexure with slot 15 comprising a central opening and the portion of the web 19 between flexures 9 and 10 and flexures 9 and 11 comprising the first and second legs 8. The third leg of the triangle in this embodiment is both the flange 18 and the member 1.

Figure 5:
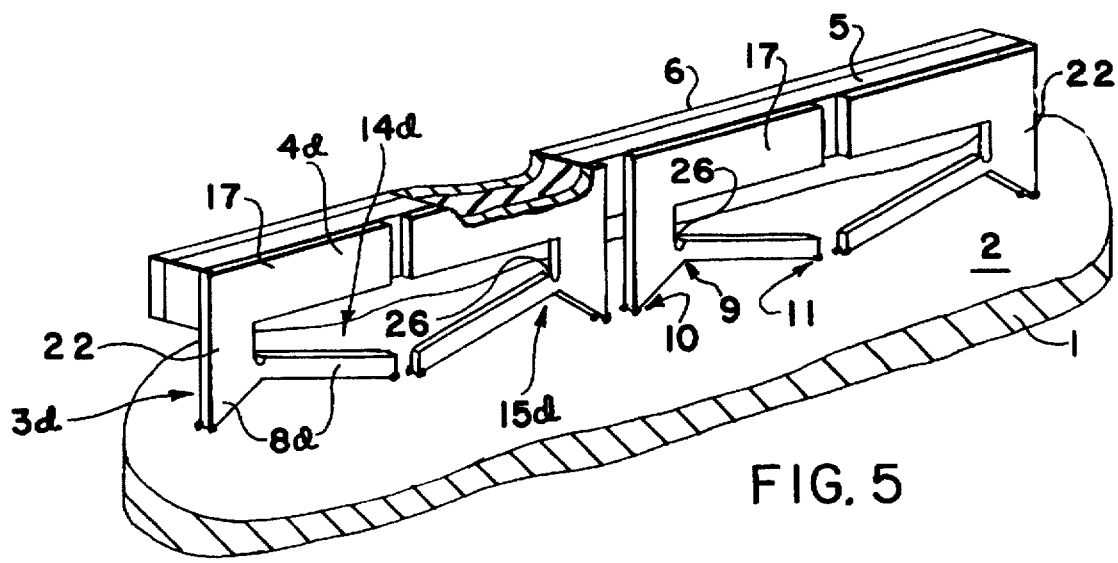
FIG. 5 is an isometric view of an embodiment of the invention functionally similar to that of FIG. 1, wherein the spacer elements have two legs of differing lengths, the divergent ends of which are affixed to the damped surface and the horizontal body portions of which are attached by the VEM to the constraining member. Each spacer element further includes a motion-amplifying lever.

FIG. 5 shows an embodiment which functions similarly to that of FIG. 1 wherein each spacer element 3d is fabricated from a plate and has cutouts 14d and 15d which correspond to slots 14 and 15 of FIG. 4 to define the spacer element 3d. There are short and long legs 8d which are attached at a first hinge flexure 9 defined by a notch 26 adjacent cutout 14d. The legs form a V-shape with the divergent ends of the legs 8d being affixed to the damped member 1 at hinge flexures 10 and 11. Body portion 22 attached to one leg 8d adjacent the vertex of the V extends vertically from the legs 8d away from the damped surface 2 and integral therewith is a horizontal lever body portion 17 extending substantially parallel to the damped member 1. The constraining member 6 is positioned in a horizontally offset relation substantially parallel to the damped surface 2 and is resiliently attached by the VEM layer 5 to the horizontal lever body portions 17. It will be noted that the horizontal lever body portion 17 is connected to the shorter of the two legs 8d through the body portion 22. As the spacer element 3d flexes, its shorter leg pivots or rotates through a greater angle than the longer leg, amplifying the motion from the shorter leg toward the cantilevered distal end of body portion 17. This amplification results in greater energy dissipation in the VEM 5 than occurs when the legs are of equal length. Where the entire cantilevered body portion 17 is connected to the constraining member 6, energy dissipation progressively increases from that end of body portion 17 where it is connected to body portion 22 toward the distal end of body portion 17.

Figure 6:
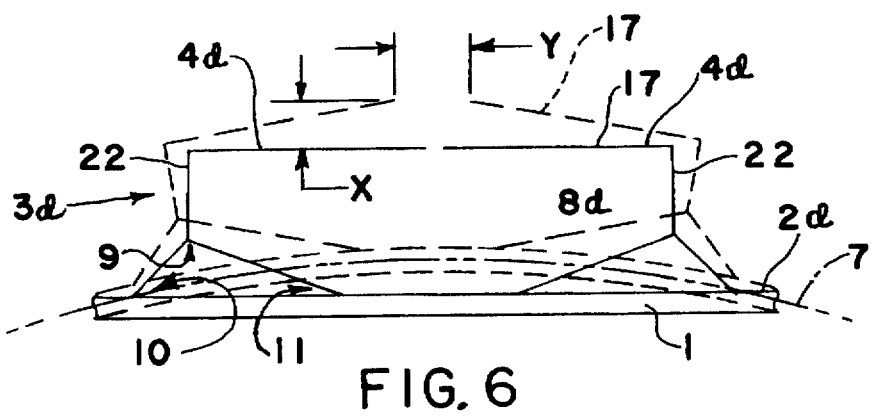
FIG. 6 is a schematic diagram of two of the spacer elements and through the levers when connected to the shorter leg of a spacer levers shown in FIG. 5 illustrating how motion can be amplified element.

FIG. 6 depicts in exaggerated fashion what occurs in the FIG. 5 structure as the elements move back and forth between their static full-line positions in opposite directions from the full-line positions. Dotted-line positions are shown in one direction only for clarity. The horizontal body portions 17 comprise a pair of cantilevered arms with their distal ends near-abutting. As the arms move toward their dotted-line positions, there is a vertical motion component consisting of the dimension X and a horizontal motion component consisting of dimension Y. The longer the arms, the larger will be the dimensions of X and Y at the distal ends. As the perpendicular and parallel shear are imparted to the VEM, the damping structure more effectively dissipates energy than one which compensates for single component forces only. The ratios of the arms can be adjusted to adapt the spacer elements 3d for a particular damping application.

Figure 7:
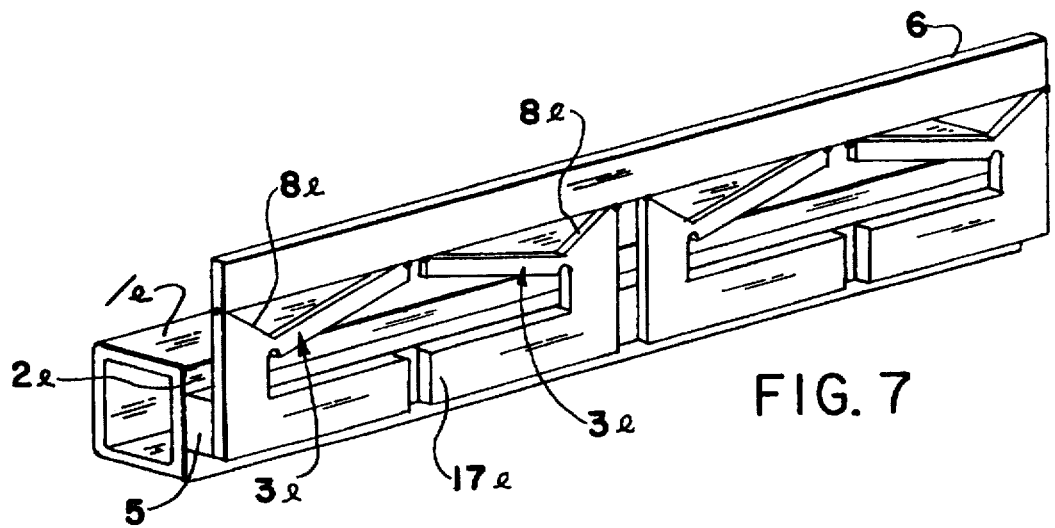
FIG. 7 is an isometric view of an embodiment of the invention employing spacer elements similar to those of FIG. 5, but arranged to function similarly to the schematic view of FIG. 3.

FIG. 7 is an embodiment similar to FIG. 5 except that the flexured ends of legs 8e of spacer elements 3e are attached to the constraining member 6 rather than to the damped member 1e and the horizontal body portion 17e is resiliently attached by the VEM layer 5 to the damped surface 2e. The damped member 1e is shown as square tubing in this embodiment, in order to provide surface 2e with sufficient area for bonding of VEM 5 thereto.

Figure 8:
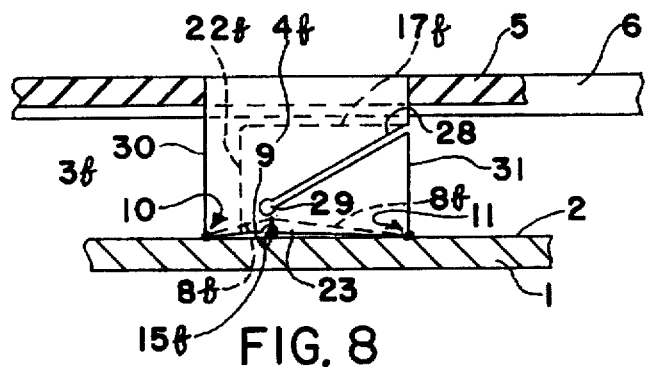
FIG. 8 is a side view of yet another embodiment using an alternate design of spacer elements essentially

FIG. 8 shows a preferred spacer element 3f which is more easily manufactured and has less waste material than spacer elements of other embodiments. FIG. 8 is functionally identical to FIG. 5 but has lower manufacturing cost and higher weight. Lower edge 23 may be relieved from contact with the surface of the damped member 1 as shown, but it is not essential to provide such relief. Spacer element 3f is rectangular in overall shape with a lower notch or opening 15f extending upwardly from lower edge 23 adjacent an edge 30 of spacer element 3f. A slot 28 extends inwardly from an edge 31 of spacer element 3f and preferably terminates at an enlarged punched or drilled opening 29 adjacent lower opening 15f. Use of the opening 29 allows for lower cost manufacturing. The slot 28, lower opening 15f and opening 29 of the slot 28 define short and long legs 8f which are connected at the first hinge flexure 9. They also define body portion 4f which comprises vertical body portion 22f and horizontal lever body portion 17f. The spacer element 3f is connected to the damped surface 2 at second hinge flexure 10 and third hinge flexure 11. The horizontal body portion 17f is resiliently connected by VEM layer 5 to the constraining member 6. The function of spacer elements 3f is similar to that described in connection with FIGS. 5 and 6.

Figure 9:
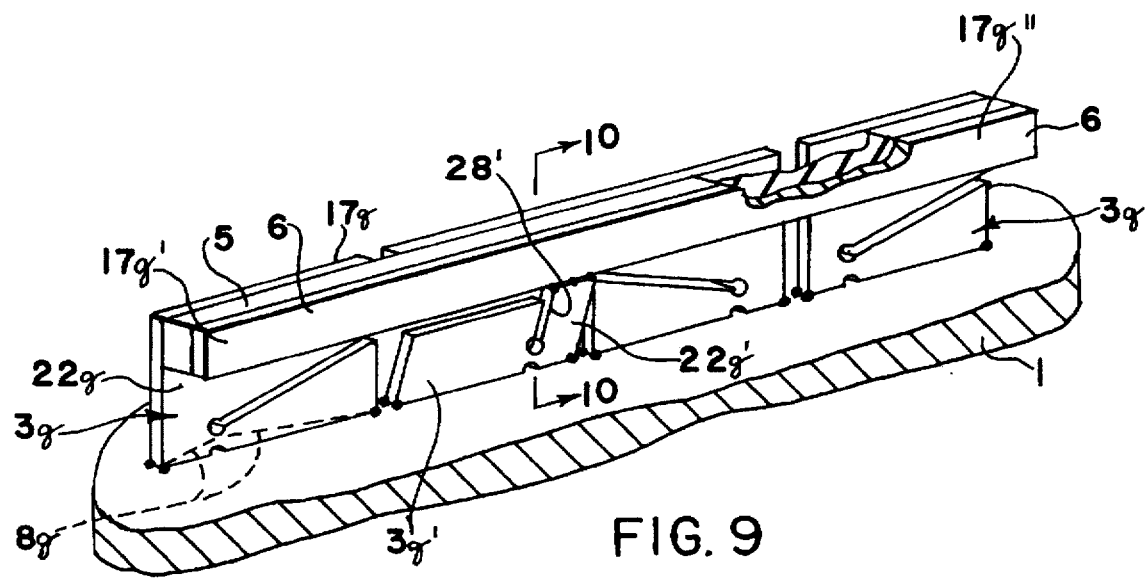
FIG. 9 illustrates a plurality of spacer elements essentially like that of FIG. 8 in a row.

As shown in FIG. 9, a substantially rigid extension 22g' of a short leg 8g of an abbreviated spacer element 3g' is affixed firmly to the constraining member 6, forming a pair of levers 17g' and 17g" extending outwardly from the extension 22g'. The lever body portions 17g of at least a second spacer element 3g remote from the first spacer element 3g' is connected to the lever 17g' and/or the lever 17g" through VEM 5. Upon deflection of the damped member 1, motion is transmitted toward the VEM 5 through both the spacer elements 3g and the levers which comprise the constraining member 6. This bi-directional motion transmission better focuses the shear forces toward the VEM while utilizing the advantageous amplification derived from the levers.

Figure 10:
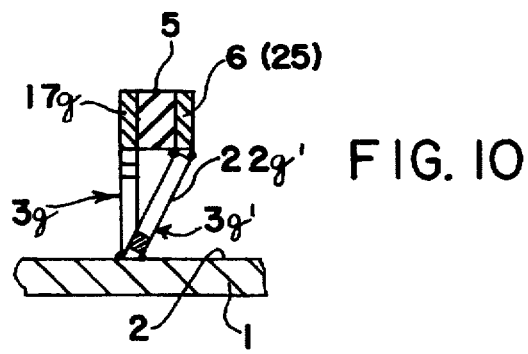
FIG. 10 is a cross-sectional view taken along lines 10—10 of FIG. 9.

FIG. 10 illustrates one manner of mounting spacer element 3g' angularly and slotting that element differently as at slot 28'.

Figure 11:
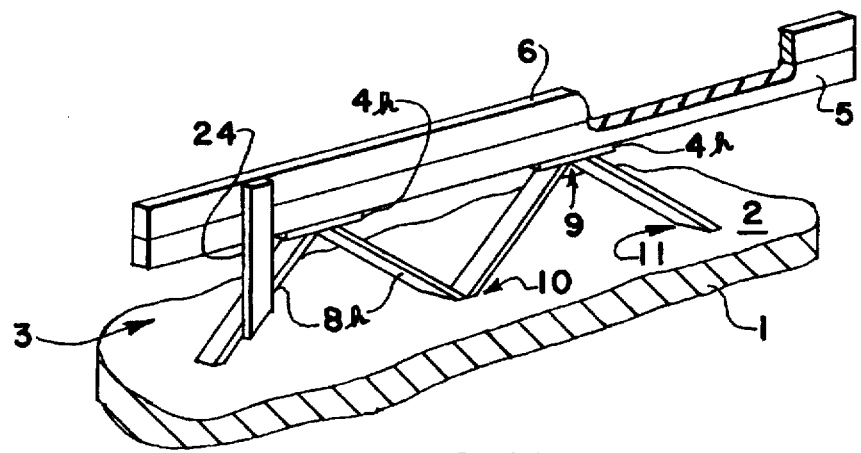
FIG. 11 is an isometric view of an embodiment which functions somewhat similarly to that of FIG. 1, wherein one leg of a spacer element is firmly affixed to the constraining member by a body portion or a substantially rigid arm member to make the constraining member a motion-enlarging cantilevered arm of that spacer element. At least a second spacer element body portion is connected by the VEM layer to the cantilevered arm at a point remote from the first spacer element.

FIG. 11 shows another embodiment of the invention which functions somewhat similarly to that of FIG. 9 but utilizes legs of equal length.

Figure 12:
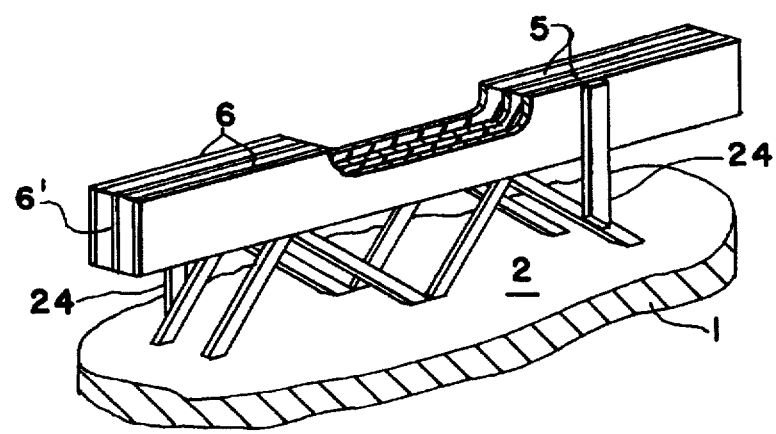
FIG. 12 is an isometric view of multiple assemblies or sets of the damping apparatus of FIG. 11 functioning as a compound damping apparatus.

FIG. 12 is the embodiment of FIG. 11 of multiple side-by-side assemblies or gangs of damping apparatus and having VEM layers 5 laterally connecting adjacent constraining members 6. The arms 24 can be staggered in relation to the assemblies to change the damping effect. A central constraining member 6' may be sandwiched between separate VEM layers on the inside surface of each constraining member 6. This embodiment illustrates the use of longitudinally-staggered fastening points for the cantilevered arms, thus enabling a single damping structure to effectively damp both long and short wave vibrations, either or both of which may have both vertical and horizontal motion components.

Figure 13:
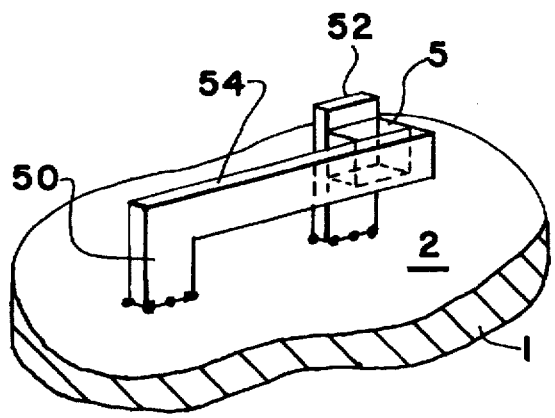
FIG. 13 is a simplified view of a damping apparatus in which a pair of standoffs are interconnected by a lever/constraining member affixed to one standoff and connected to the other by VEM.

FIG. 13 is an extremely simplified construction of damping apparatus in which the advantage of motion amplification can be achieved between a first standoff 50 and a second standoff 52 both firmly affixed to structure member 1. A portion 54 of standoff 50 serves as both a constraining member and a cantilevered motion amplifying arm. The distal end of portion 54 is attached by VEM 5 to the distal end of standoff 52. The generic term standoff has been used in connection with FIG. 13 to illustrate that the motion amplifying leverage of a cantilevered arm is beneficial with or without the particular type of spacer element described in the previous embodiments.

It should be understood that while prior art damping apparatuses and the damped structure are typically made of metal, structural materials other than metal (e.g. composites or plastics) may be used both as the damping apparatus and structure to be damped.

Various other changes may be made without departing from the spirit and scope of the claims.

Having described my invention, I claim:

1. An apparatus for damping vibrations and wave motions of an elongated structure member having an extended surface, said damping occurring between said structure member and an elongated extensionally stiff constraining member having an extended surface offset laterally from and substantially parallel to said structure member extended surface, said damping apparatus comprising:

a triangle comprising first and second extensionally stiff legs joined at a first hinge flexure, at least one of which first and second legs has a body portion adjacent the first hinge flexure;

distal ends of said first and second legs being connected by means of second and third hinge flexures respectively to a given length of one of said extended surfaces, whereby said given length constitutes a third leg of said triangle;

the triangle extending between and interconnecting the structure member and the constraining member and serving to transmit motion due to vibrations in said structure member relative to said constraining member;

at least one standoff having one end fastened to the extended surface of that member to which said second and third hinge flexures are connected and the opposite end of said standoff having a body portion remote from said one end, said standoff being generally aligned with and located remote from said triangle along the extended surface to which the triangle is attached;

that member other than the member to which the standoff is fastened spanning and interconnecting the triangle body portion with said standoff body portion; and, at least one oscillatory energy-dissipating mechanism connecting at least one of said body portions to the member spanning said portions.

2. A damping apparatus according to claim 1 wherein said energy-dissipating mechanism is a VEM layer.

3. A damping apparatus according to claim 2 wherein said standoff comprises a second triangle.

4. A damping apparatus according to claim 3 wherein body portions of both triangles are connected by means of VEM to that one of said members spanning said portions.

5. A damping apparatus according to claim 2 wherein that member other than the member to which the standoff is attached comprises a flexurally-stiff lever which is firmly affixed to one leg of said triangle and wherein said VEM connects the distal end of said lever to said standoff body portion.

6. A damping apparatus according to claim 5 wherein said first and second legs are of unequal lengths and wherein said lever is affixed to the shorter one of said legs, whereby oscillatory motion of said lever is amplified between said triangle body portion and the distal end of said lever.

7. A damping apparatus according to claim 6 wherein a plurality of damping apparatus are provided in closely adjacent relationship and are interconnected by means of VEM, and wherein at least one of each plurality of triangles includes a lever, adjacent levers of different apparatus extending in opposite directions from their respective triangles.

8. A damping apparatus for a structure member having an extended surface subject to wave motions or flexural vibrations, comprising:

at least two essentially aligned, linearly-extending spaced apart V-shaped spacer elements each having two substantially rigid legs and a body portion adjacent to the vertex on the V, each leg having two ends, one end of each leg being flexurally attached to one end of the other leg at the vertex to form the V-shape, the V being oriented substantially normal to the surface of the structure member;

an elongated substantially rigid constraining member spanning said at least two spacer elements, said constraining member being positioned in a laterally-offset relation substantially parallel to the surface of the structure member;

an energy-dissipating mechanism connecting the body portions of the spacer elements to one of the structure or constraining members, and;

the ends of the legs opposite the vertex being flexurally affixed to the other of said structure or constraining members.

9. The damping apparatus according to claim 8 wherein said energy-dissipating mechanism comprises a layer of VEM.

10. The damping apparatus according to claim 9 wherein the member to which the ends of the legs opposite the vertex are affixed is the damped structure member and the VEM layer connects the body portions to the constraining member.

11. The damping apparatus according to claim 10, wherein each said spacer element is fabricated from a beam member having an interrupted upper flange, an uninterrupted lower flange offset from the upper flange, and an interrupted web interconnecting the flanges and substantially perpendicular to the flanges, the beam member having at least one longitudinally located slot cutout laterally extending completely through the upper flange and web to form discrete spacer elements joined by the lower flange, each V-shaped spacer elements having two ends, a longitudinal line between the ends and three cutouts through the web, two of the cutouts disposed on opposite sides of the longitudinal line of each spacer element adjacent the upper flange to comprise a first hinge flexure in the web, and the third cutout disposed about the longitudinal centerline of each spacer element adjacent the lower flange and extending longitudinally toward both spacer element ends to points adjacent the ends so as to comprise second and third hinge flexures in the web, the web between the first and second flexures and the first and third flexures comprising the two legs of each V-shaped spacer element, respectively, the upper flange sections of each spacer element comprising its body portion and the second and third flexures forming the divergent ends of the legs.

12. The damping apparatus according to claim 9 wherein the member to which the ends of the legs opposite the vertex are affixed is the constraining member and the VEM layer connects the body portions to the damped structure member.

13. The damping apparatus according to claim 8, wherein the body portion of each spacer element has a horizontally-extending lever portion which is substantially parallel to the surface of said structure member.

14. The damping apparatus according to claim 8, wherein the V-shaped spacer elements are formed from a rectangular plate, each spacer element having an upper edge, a lower edge, a first side edge and a second side edge, an upper opening and a lower opening, said openings being positioned adjacent the lower edge and first side edge, the lower opening extending through the lower edge, the upper opening being connected to the second side edge by a slot, the space between the openings comprising a first flexural hinge joint, the area below the slot comprising one of said legs and the remaining area of the plate comprising the other of said legs, and said body portion extending above said slot and generally parallel to the surface of the structure member.

15. The damping apparatus according to claim 14, wherein one of said spacer elements is tilted slightly off normal to the surface of the damped structure with the horizontally-extending body portion of said spacer element being firmly affixed to the member attached to the spacer elements by VEM, said second spacer element being immediately adjacent the tilted spacer element, said second spacer element having a horizontal lever extending from and overlapping the spacer element with said tilted leg, said lever being attached by VEM to the member to which the other V-shaped spacer element body portions are attached by VEM.

* * * * *